United States Patent
Subrahmanyam

(10) Patent No.: US 7,318,011 B2
(45) Date of Patent: Jan. 8, 2008

(54) FACIAL CHARACTERISTIC BASED GENERATION OF FILLET WELD BEAD REPRESENTATION

(75) Inventor: Somashekar Ramachandran Subrahmanyam, Farmington Hills, MI (US)

(73) Assignee: Autodesk, Inc., San Rafael, CA (US)

( * ) Notice: Subject to any disclaimer, the term of this patent is extended or adjusted under 35 U.S.C. 154(b) by 527 days.

(21) Appl. No.: 10/651,452

(22) Filed: Aug. 29, 2003

(65) Prior Publication Data

US 2005/0049742 A1   Mar. 3, 2005

(51) Int. Cl.
G06F 17/50  (2006.01)
(52) U.S. Cl. .............................. 703/1; 700/98; 228/102
(58) Field of Classification Search ....................... 703/1
See application file for complete search history.

(56) References Cited

U.S. PATENT DOCUMENTS

| | | | |
|---|---|---|---|
| 4,561,059 A | 12/1985 | Davis et al. | |
| 4,877,940 A | 10/1989 | Bangs et al. | |
| 5,040,125 A | 8/1991 | Okumura et al. | |
| 5,708,469 A * | 1/1998 | Herzberg | 348/39 |
| 5,774,359 A * | 6/1998 | Taneja | 700/86 |
| 6,249,718 B1 * | 6/2001 | Gilliland et al. | 700/255 |
| 6,392,193 B1 | 5/2002 | Mallenahalli et al. | |
| 6,392,645 B1 | 5/2002 | Han et al. | |
| 6,445,388 B1 | 9/2002 | Subrahmanyan | |
| 6,489,957 B1 | 12/2002 | Han et al. | |
| 6,515,258 B2 | 2/2003 | Corby et al. | |
| 6,583,386 B1 | 6/2003 | Ikovich | |

(Continued)

OTHER PUBLICATIONS

Subrashekar et al, "Feature Attributes and Their Role in Product Modeling", Solid Modeling '95, Salt Lake City, Utah, 1995.*
Computer & Automation Institute, "PROARC, No. 7831, CAD-Based Programming System for Arc Welding Robots in One-Off Production Runs", ESPRIT, Jan. 16, 2001.*
Wang et al, "The Design and Fabrication of Welded Tubular Joints Using Solid Modelling Techniques", 2nd ACM Solid Modeling, 1993.*
Subrahmanyam, Somashekar, "Fixturing Features Selection in Feature-Based System", Computers in Industry, vol. 48, pp. 99-108, 2002.*

(Continued)

*Primary Examiner*—Paul Rodriguez
*Assistant Examiner*—Mary C. Jacob
(74) *Attorney, Agent, or Firm*—Fish & Richardson P.C.

(57) ABSTRACT

A computing environment is provided with the ability to contribute to generate a representation for a fillet weld bead to be used to fillet weld a number components of an article of manufacture together at one or more faces of the components in the manufacturing of the article outside the computing environment, including the ability to examine facial characteristics of the faces, select a generation technique based at least in part on the result of the examination, and apply the selected generation technique followed by end trimming to generate a data representation of the fillet weld bead.

42 Claims, 18 Drawing Sheets

U.S. PATENT DOCUMENTS

| | | |
|---|---|---|
| 6,629,011 B1 | 9/2003 | Calderon et al. |
| 6,697,701 B2 | 2/2004 | Hillen et al. |
| 6,795,778 B2 | 9/2004 | Dodge et al. |
| 6,801,217 B2 | 10/2004 | Andersson |
| 6,912,447 B2 | 6/2005 | Klimko et al. |
| 7,050,960 B2 * | 5/2006 | Hoelle et al. ............ 703/22 |
| 7,110,922 B2 * | 9/2006 | Onodera et al. ............ 703/2 |
| 2004/0010342 A1 | 1/2004 | Thelan |
| 2004/0122550 A1 | 6/2004 | Klimko et al. |
| 2004/0129759 A1 | 7/2004 | Rouault et al. |

OTHER PUBLICATIONS

Subrahmanyam, Somashekar, "A Method for Generation of Machining and Fixturing Features from Design Features". Computers in Industry, vol. 47, pp. 269-287, 2002.*

Parametric Technology Corporation, "Pro/Engineer 2001, Pro/Welding Topic Collection".

Joe Greco, "A Visual Guide to Solid Edge 10," http://mcadvision.ibsystems.com/October2001/case_full.php.

* cited by examiner

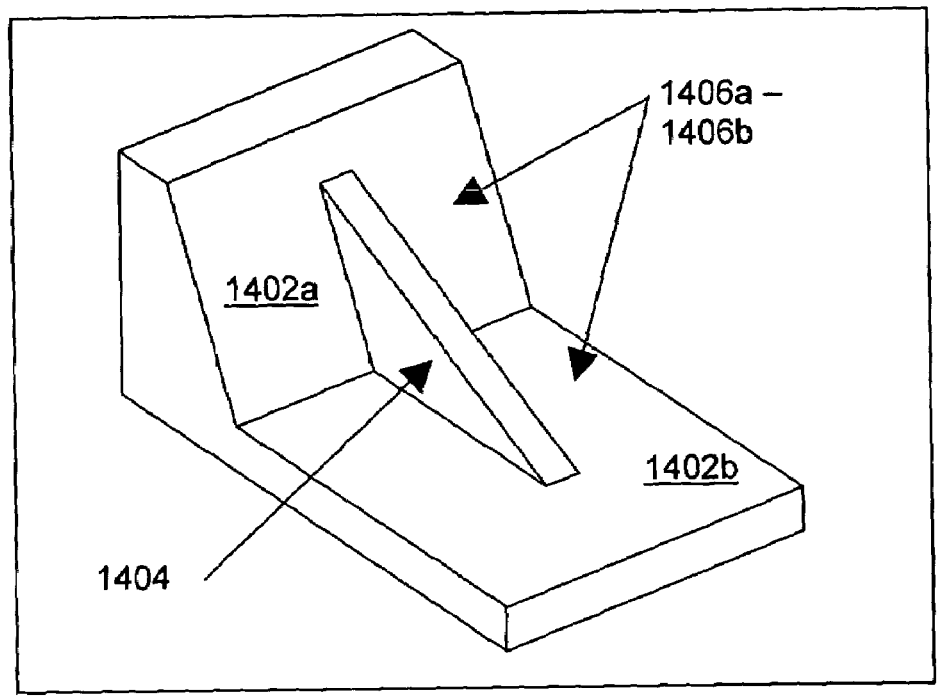
Figure 14a
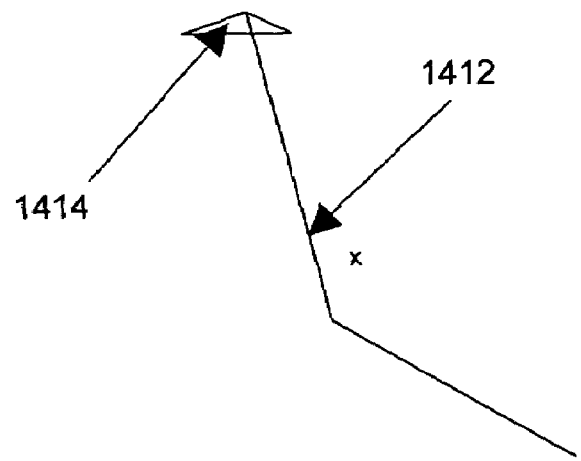
Figur 14b

FACIAL CHARACTERISTIC BASED GENERATION OF FILLET WELD BEAD REPRESENTATION

BACKGROUND

Advances in computing technology have made possible the provision of computer-aided-design (CAD) software to support the design and manufacturing of articles. Modern CAD software not only includes sketching or schematic features, but also solid modeling and other advanced features.

Manufacturing of articles often involves the welding of two or more components of an article into one single piece. A variety of welding types may be employed, including what is referred to as fillet welds. Accordingly, it is desirable for CAD software to support modeling of welding, in particular, fillet welding.

A few commercial CAD systems offer support for representing welds. Externally, the support includes highlighting and/or labeling of the edges of the components involved. Alternatively, some CAD systems generate a solid representation of the bead. However, the method in which the highlighting/labeling of the edges is done or how the solid bead is generated is not known fully.

BRIEF DESCRIPTION OF THE DRAWINGS

Embodiments of the present invention will be described referencing the accompanying drawings in which like references denote similar elements, and in which:

FIGS. 14a-14e illustrate an example application of one embodiment of the present invention.

DETAILED DESCRIPTION OF EMBODIMENTS OF THE INVENTION

Embodiments of the present invention include, but are not limited to, methods to model/represent fillet welds in acomputing environment, instructions implementing or contributing to the implementation of the methods, components, devices and systems incorporated with one or more implementations.

In the following description, various aspects of embodiments of the present invention will be described. However, it will be apparent to those skilled in the art that embodiments of the present invention may be practiced with only some or all aspects described. For purposes of explanation, specific numbers, materials and configurations are set forth in order to provide a thorough understanding of these embodiments of the present invention. However, it will be apparent to one skilled in the art that various embodiments of the present invention may be practiced without the specific details. In other instances, well-known features are omitted or simplified in order not to obscure the disclosed embodiments of the present invention.

Various operations will be described as multiple discrete operations in turn, in a manner that is helpful in understanding these embodiments of the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
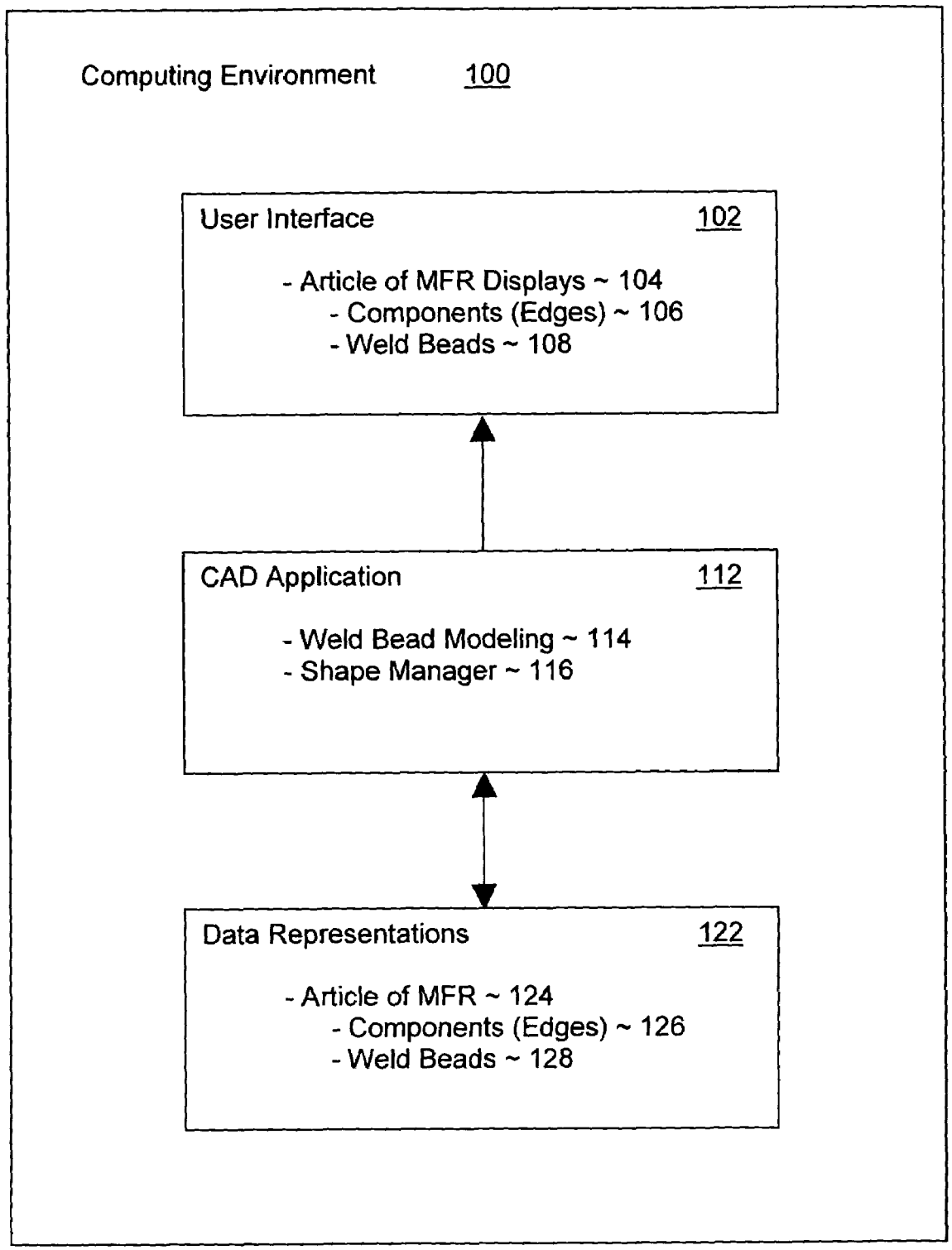
FIG. 1 illustrates a computing environment incorporated with one embodiment of the present invention.

Referring now to FIG. 1 wherein a computing environment incorporated with one embodiment of the present invention is illustrated. As shown, for the embodiment, computing environment 100 includes CAD application 112, having associated user interface 102 and data representations 122. CAD application 112 includes a number CAD functions, in particular, weld bead modeling function 114 and shape manager 116. The various CAD functions, including weld bead modeling function 114 and shape manager 116 are equipped to create, process and delete various data representations 124 of articles of manufactures, including data representations 126 of their components and edges, and data representations 128 of weld beads. Resultantly, articles of manufactures may be modeled and displayed 104 in user interface 102, including their components, edges and weld beads, 106 and 108.

Except for weld bead modeling function 114, CAD application 112 including shape manager 116 represent a broad range of these elements. For example, CAD application 112 may be implemented based on Inventor 7 (also referred to as Autodesk Inventor Series) product available from Autodesk Inc. of San Rafael, Calif.

In alternate embodiments, CAD application 112 including shape manager 116 may be implemented with other CAD applications with an integral geometric modeler, or other CAD applications employing a complementary standalone geometric modeler instead.

Similarly, data representations 122 may be implemented in a variety of manners, including but are not limited to link lists, relational tables, and other data organizations/structures of the like. Likewise, user interface 102 may be implemented in any one of a number of manners, in particular, a graphical manner.

Figure 2A:
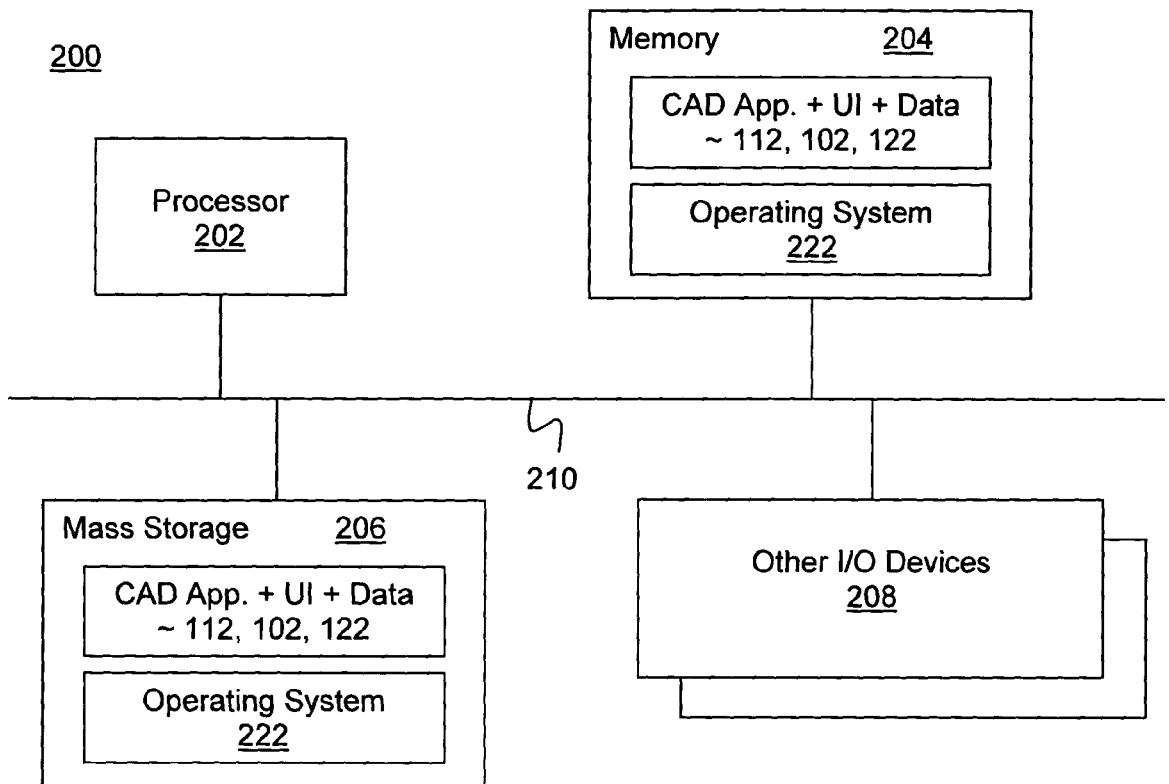
FIGS. 2a-2b illustrate two examples of computing environments of FIG. 1.

FIG. 2a illustrates one embodiment of computing environment 100 of FIG. 1. As illustrated, for the embodiment, computing environment 100 is a computing device 200 incorporated with one embodiment of the present invention. More specifically, computing device 200 includes processor 202, memory 204, mass storage device 206 and other I/O devices 208, coupled to each other via bus 210, as shown.

Memory 204 and mass storage device 206 include a transient working copy and a persistent copy of CAD application 112, including associated user interface 102 and data representations 122 of FIG. 1. Further, for the embodiment, memory 204 and mass storage device 206 include a transient working copy and a persistent copy of operating system 222, providing a number of system services to CAD application 112.

Processor 202, memory 204, mass storage 206, I/O devices 208, and bus 210 represent a broad range of such elements.

In other words, except for CAD application 112 endowed with weld bead modeling function 114, computing device 200 represent a broad range of such devices, including but are not limited a server, a desktop computer, a computing tablet, a laptop computer, a palm sized personal assistant, a pocket PC, or other computing devices of the like.

Figure 2B:
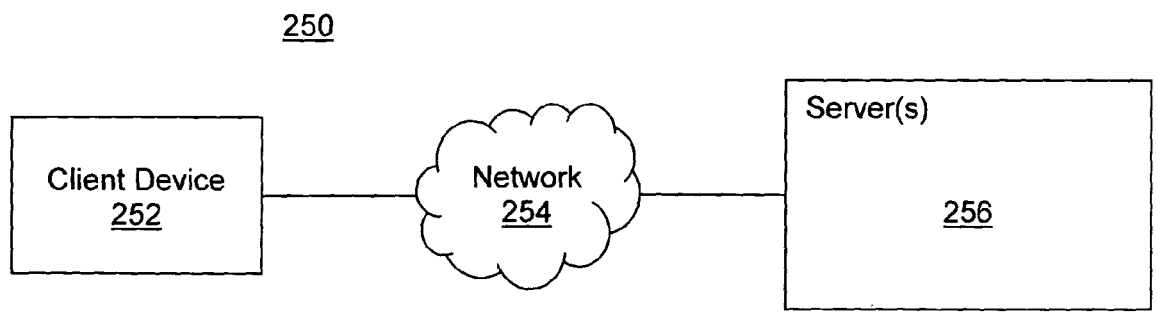

FIG. 2b illustrates another embodiment of computing environment 100 of FIG. 1. As illustrated, for the embodiment, computing environment 100 is a networked computing environment 250 including client device 252 and server 256 coupled to each other via network 254.

Collectively, client device 252 and server 256 are equipped with an embodiment of CAD application 112, including associated user interface 102 and data representations 122. In other words, CAD application 112, including associated user interface 102 and data representations 122 are distributively disposed on client device 252 and server 256. In various embodiments, client device 252 and server 256 may be computing device 200 of FIG. 2a.

Similarly, network 254 represents a broad range of local area, wide area, private and/or public networks. An example of a public network is the Internet.

Figure 3:
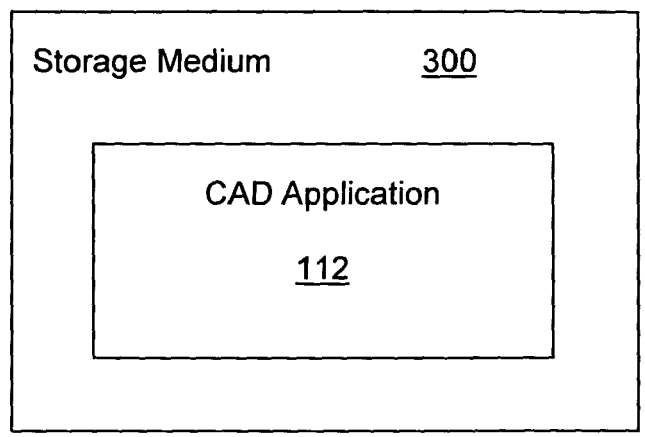
FIG. 3 illustrates an example machine readable article having instructions implementing all or portions of the CAD application of FIG. 1.

FIG. 3 illustrates a machine readable article suitable for use to store executable instructions implementing all or portions of the CAD application 112 of FIG. 1, including weld bead modeling function 114, in accordance with one embodiment. For the embodiment, the machine readable article includes storage medium 300 and instructions implementing all or portions of a CAD application 112, including weld bead modeling function 114, stored therein. The stored instructions may be used to program an apparatus, such as computing device 200 of FIG. 2a, or client device 252 and/or server 254 of FIG. 2b.

In various embodiments, storage medium 300 may be a diskette, a tape, a compact disk (CD), a digital versatile disk (DVD), a solid state storage device, or other electrical, magnetic and/or optical storage device of the like.

Figure 4:
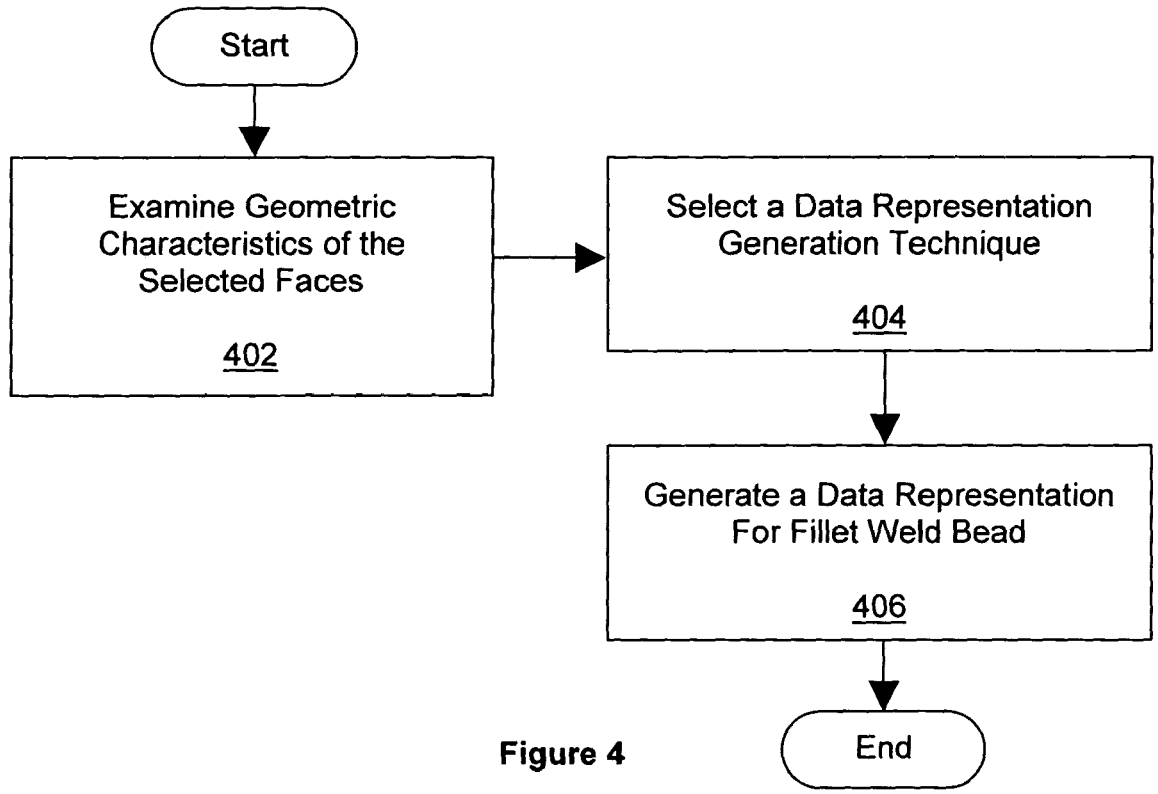
FIG. 4 illustrates one embodiment of the overall operational flow of the weld bead modeling function of FIG. 1 in relation to modeling fillet welds.

FIG. 4 illustrates one embodiment of the overall operational flow of weld bead modeling function 114 of FIG. 1 in relation to modeling fillet welds. The embodiment assumes CAD application 112 includes the functions for facilitating entry into a welding modeling mode of operation, where on entry, weld bead modeling function 114 is invoked. Further, CAD application 112 includes the functions for facilitating selection of the faces of the components of an article of manufacture involved in a particular fillet welding operation to fillet weld the components of the article together during manufacturing. For example, CAD application 112 may include support to facilitate a user in making the selection using a cursor control device, such as a mouse, trackball, a touch pad and so forth. The support may leverage user input device services provided e.g. by operating system 222.

Still referring to FIG. 4, as illustrated, on selection, weld bead modeling function 114 first examines predominantly the geometric characteristics of the selected faces of the selected components, block 402. In various embodiments, the geometric characteristics may include, but are not limited to,
  whether the selected faces to be fillet welded have "simple" geometry such as whether a selected face is planar or a selected face is cylindrical, and so forth,
  whether the selected faces of a selected component lie on a single plane, and
  whether two corresponding faces of the selected components are perpendicular.

Next, for the embodiment, weld bead modeling function 114 selects a generation technique to generate a data representation to model a fillet weld bead, based at least in part on the result of the examination, block 404. For ease of understanding, hereinafter, the description may simply be presented referring to various generation operations as generating a fillet weld bead or other physical entities, without repeatedly qualifying the various generation operations as generating data representations or models of the fillet weld bead or other physical entities (as opposed to the physical entities themselves). Thus, for the purpose of the present application, unless the context clearly indicates to the contrary, the phrases "generating a fillet weld bead", "generating a data representation of a fillet weld bead", "generating a model of a fillet weld bead", and other phrases of the like, are to be considered as synonymous.

In various embodiments, the generation techniques being considered may include, but are not limited to
  a triangular technique, and
  a quadrilateral technique.

Further, in various embodiments, the triangular technique is selected if, all of the above enumerated conditions are met, else the quadrilateral technique is selected.

Upon selecting the generation technique, weld bead modeling function 114 proceeds to generate the fillet weld bead, block 406.

Figure 5:
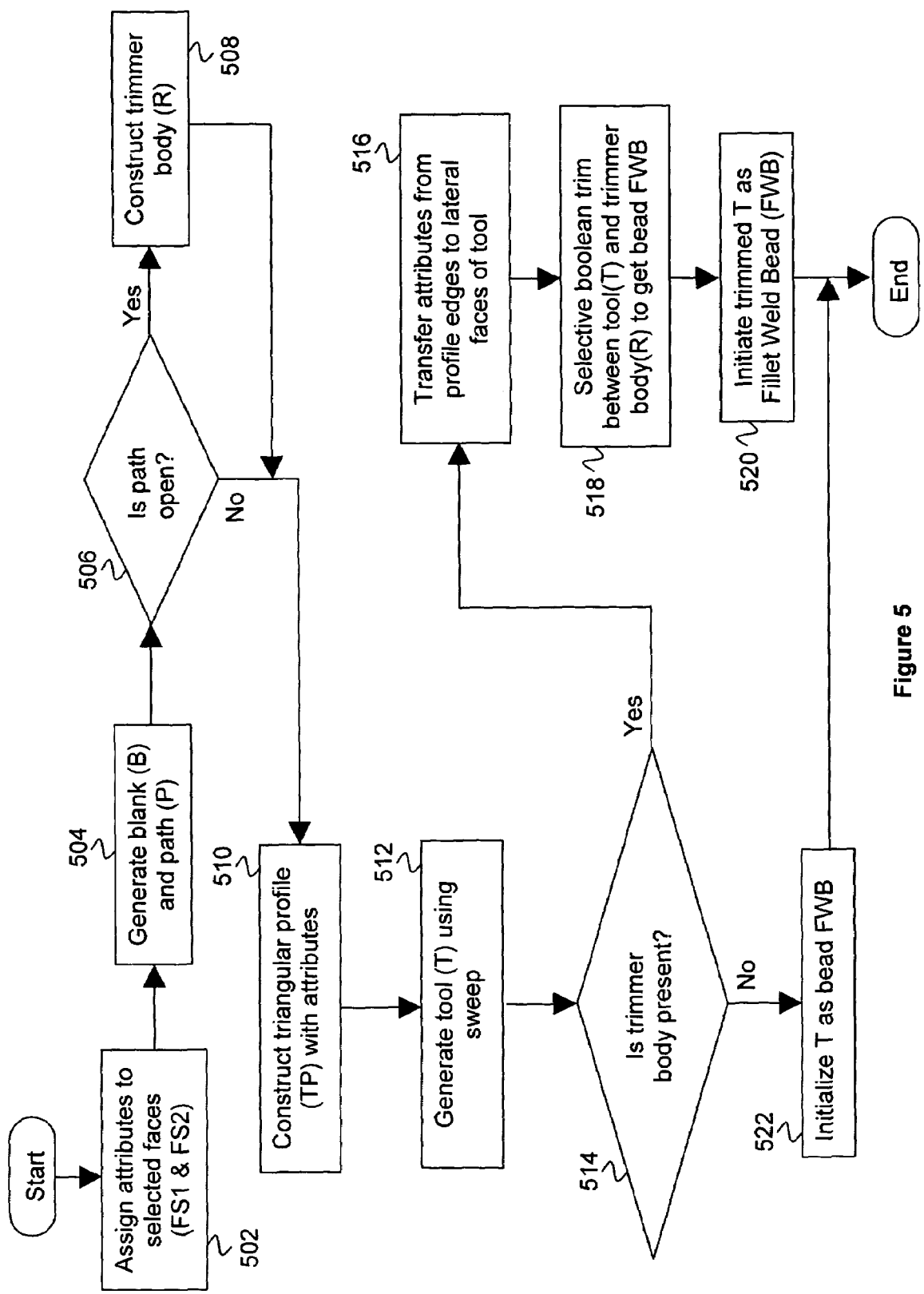
FIG. 5 illustrates one triangular profile embodiment of the operational flow in further detail.

Referring now to FIG. 5, wherein one embodiment of the operational flow of the triangular technique is illustrated. As shown, for the embodiment, weld bead modeling function 114 first assigns shape manager attributes to the selected faces (FS1 and FS2), block 502. In various embodiments, the attributes specify, among other things, the attributes are to be propagated whenever a split, copy or merge operation is performed on each of the selected edges. More specifically, the split, copy and merge behaviors are specified such that, during a split or copy operation, which results in an old entity and a new entity, a copy of the attribute on the old entity propagates itself to the newly formed entity. During a merge operation of two entities, all the original attributes from the two entities are retained on the merged entity.

Further, in various embodiments, the attributes include information that allows various aspects of the split, copied or merged versions to be tracked back to the original selected faces.

Note that all operations performed, including any split, copy or merge operations, in substance are performed on data representations 122 of the faces of the components by shape manager 116. For ease of understanding, further description may not be burdened with the repeated clarification. However, the description should be so read, unless the context clearly indicates otherwise.

Still referring to FIG. 5, at block 504, weld bead modeling function 114 generates a blank (B) and a path (P). In various embodiments, the blank is generated based at least in part on the selected faces of the selected components, and the path is generated, based at least in part on the blank.

Thereafter, weld bead modeling function 114 determines if, the path is open, block 506. If the path is not open, weld bead modeling function 114 proceeds to perform the operations of block 510, however, if the path is open, weld bead modeling function 114 first generates a trimmer body, block 508, before proceeding to perform the operations of block 510.

Figure 6:
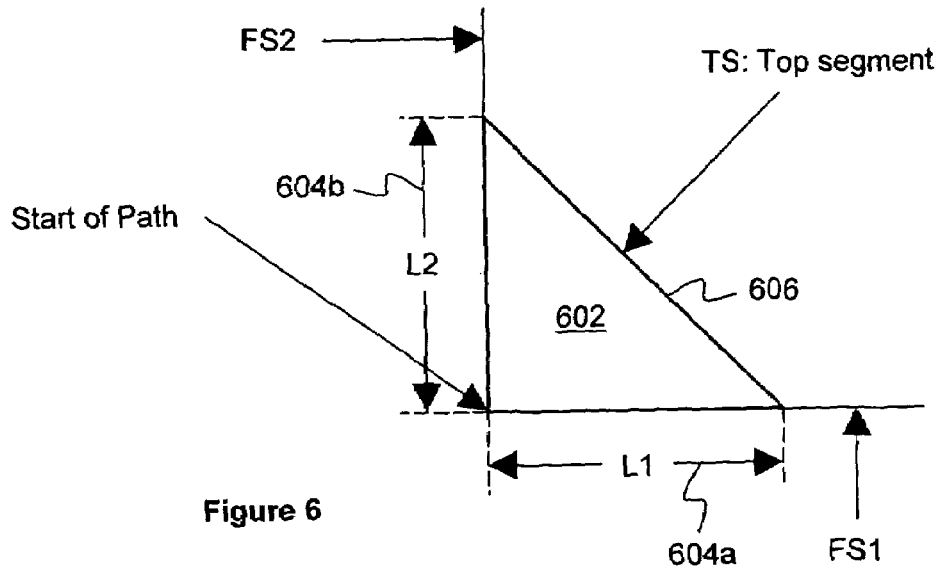
FIG. 6 illustrates one embodiment of a triangular profile.

At block 510, weld bead modeling function 114 generates a triangular profile (TP) 602, by calling a shape manager API, an example of which is illustrated in FIG. 6. The side edges 604a and 604b of triangular profile 602 coincident with the selected faces are referred to as the "legs", L1 and L2. The hypotenuse 606 is referred to as the top segment (TS).

In various embodiments, the triangular profile 602 is generated in a plane perpendicular to the path at the starting point of the path. If the path is open, the starting point may be at either one of the end points. If a path is closed, then the starting point may be at any arbitrary point of the path.

Referring back to FIG. 5, at block 512, weld bead modeling function 114 generates a tool (T) by sweeping triangular profile 602 along the earlier generated path. In various embodiments, weld bead modeling function 114 calls shape manager 116 to generate the sweep.

At block 514, weld bead modeling function 114 determines if, a trimmer body was earlier generated. If a trimmer body was not generated earlier, weld bead modeling function 114 proceeds to initialize the tool as the fillet weld bead, more specifically, the data representation of the tool as the data representation of the fillet weld bead, FWB, block 522.

If a trimmer body was generated earlier, weld bead modeling function 114 first transfers the attributes from the edges of the profile to the lateral faces of the tool, block 516, and performs a selective boolean operation in shape manager 116 on the tool and the trimmer body to trim the tool, block 518. Thereafter, weld bead modeling function 114 initializes the trimmed tool as the fillet weld bead, FWB, block 520. More specifically, as earlier described, the initialization involves initializing the data representation of the tool as the data representation of the fillet weld bead.

Figure 9:
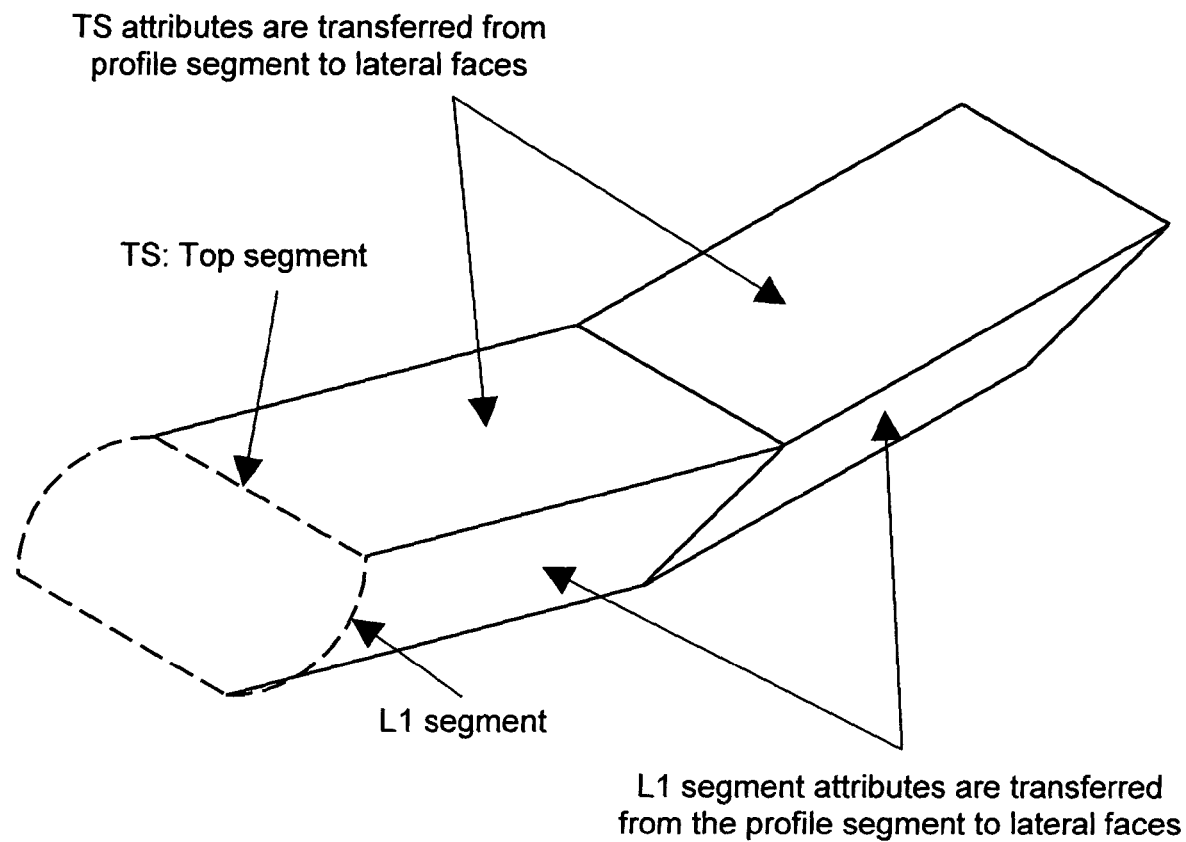
FIG. 9 illustrates an example transfer of profile attributes to lateral faces in a tool generated by sweeping a profile along a path.

An example of the attribute transfer operations (in the context of a quadrilateral profile) is illustrated in FIG. 9. The attribute transfer operations are similar, whether a triangular or a quadrilateral profile is involved.

In various embodiments, weld bead modeling function 114 calls shape manager 116 to perform a selective boolean operation which provides a topology data structure of the tool and the trimmer body with "cells" identified as being cells of the tool, the trimmer body, or both. In various embodiments, weld bead modeling function 114 calls shape manager 116 to perform the boolean operation by selecting only "tool-only" cells whose faces satisfy the following:

at least one unique face has a L1 attribute,
at least one unique face has a L2 attribute, and
at least one unique face has a TS attribute.

A number of earlier described aspects of the triangular technique, in particular, the generation of a blank, a path, and a trimmer body, will be further described later, after an overview description of the quadrilateral technique.

Figure 7:
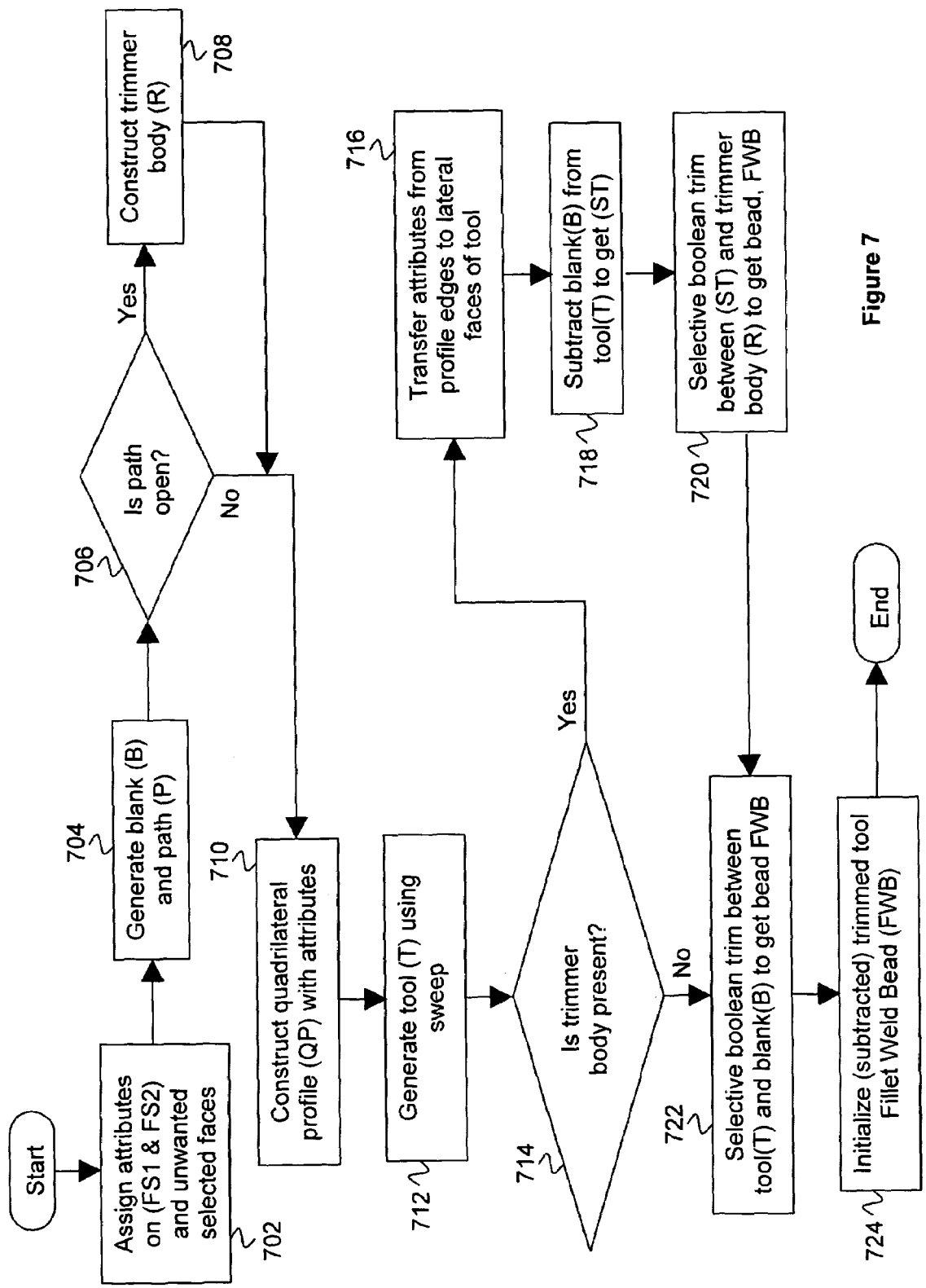
FIG. 7 illustrates one quadrilateral profile embodiment of the operational flow in further detail.

Referring now to FIG. 7, wherein one embodiment of the operational flow of the quadrilateral technique is illustrated. As shown, for the embodiment, the initial operations are similar to the earlier described triangular technique. That is, weld bead modeling function 114 first assigns shape manager attributes to the selected faces, block 702. Then, weld bead modeling function 114 generates a blank (B), based at least in part on the selected faces of the selected components, and generates a path (P), based at least in part on the generated blank, block 704.

Thereafter, weld bead modeling function 114 determines whether the path is open, block 706, and constructs a trimmer body, block 708, before proceeding to perform the operations of block 710.

Figure 8:
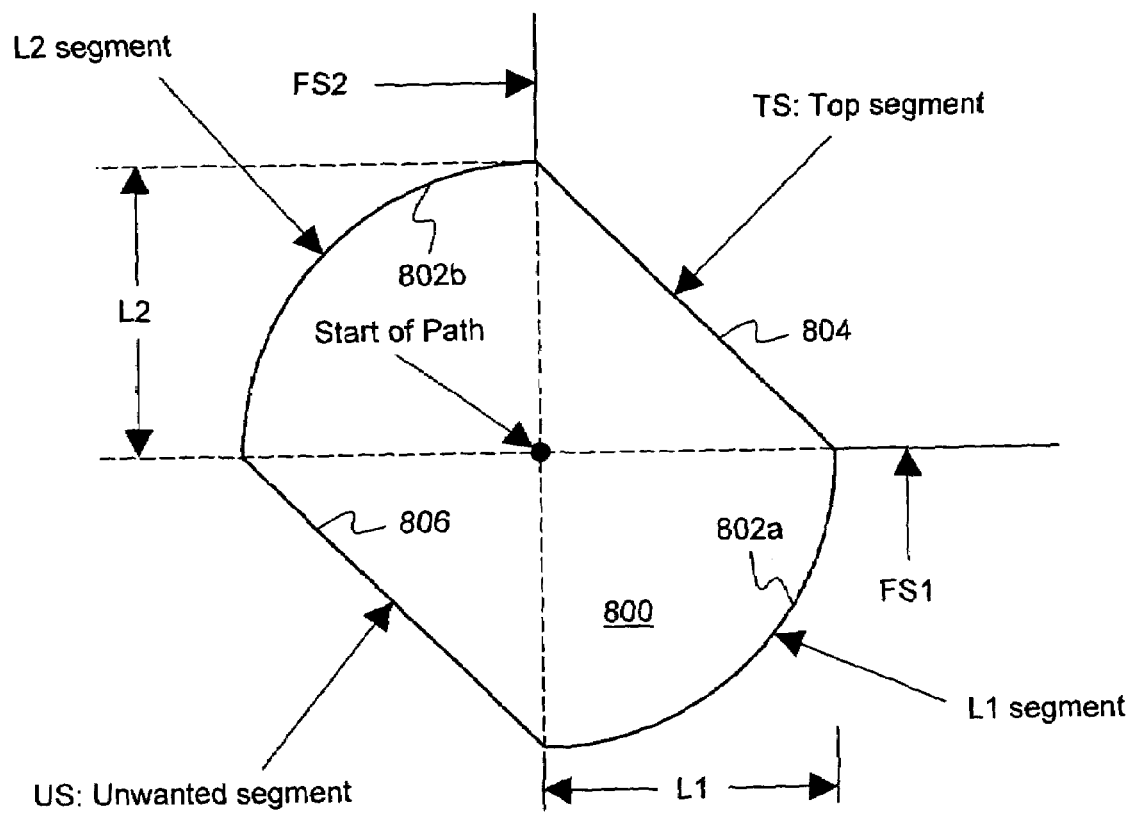
FIG. 8 illustrates one embodiment of a quadrilateral profile.

At block 710, weld bead modeling function 114 generates a profile, using shape manager API, however, for the quadrilateral technique, as the name suggests, the profile is a quadrilateral profile (QP). An example quadrilateral profile 800 is illustrated in FIG. 8. Edge 804 extending from one of the selected faces to the other is referred to as the top segment (TS), and edges 802a-802b are referred to as the "leg" segments, L1 and L2. Edge 806 is referred to as the unwanted segment (US).

Referring back to FIG. 7, at block 712, weld bead modeling function 114 generates a tool (T) by sweeping the quadrilateral profile along the path, using a shape manager API, block 712. Thereafter, weld bead modeling function 114 determines if, a trimmer body was earlier generated, block 714.

If a trimmer body was not earlier generated, weld bead modeling function 114 performs a selective boolean operation by calling shape manager 116 API on the tool and the trimmer body to trim the tool, block 722, and upon trimming the tool, initializes the trimmed tool as the fillet weld bead, FWB, block 724. More specifically, as earlier described, the initialization involves initializing the data representation of the tool as the data representation of the fillet weld bead.

However if, a trimmer body was earlier generated, weld bead modeling function 114 first transfers attributes from edges of the profile to lateral faces of the tool, block 716, and subtracts the blank from the tool by calling a shape manager API to generate a subtracted tool, block 718, before proceeding to perform the operations at block 720. As mentioned earlier, an example of the attribute transfer operations is illustrated in FIG. 9.

At block 720, weld bead modeling function 114 using shape manager 116 performs a selective boolean operation on the subtracted tool and the trimmer body to trim the subtracted tool, and upon trimming the subtracted tool, initializes the trimmed subtracted tool as the fillet weld bead, FWB, block 724. More specifically, as earlier described, the initialization involves initializing the data representation of the trimmed subtracted tool as the data representation of the fillet weld bead.

In various embodiments, weld bead modeling function 114 calls shape manager 116 to provide a topology data structure of the tool and the trimmer body with "cells" identified as being cells of the tool, the trimmer body, or both.

In various embodiments, weld bead modeling function 114 performing the boolean operation selects only those cells which satisfy the following:

at least one unique face has a A1 attribute,
at least one unique face has a A2 attribute,
at least one unique face has a TS attribute, and
none of the faces of the cell have a US attribute.

A1 and A2 attributes are ownership attributes assigned as part of the generation of the blank, to be further described below.

Figure 10:
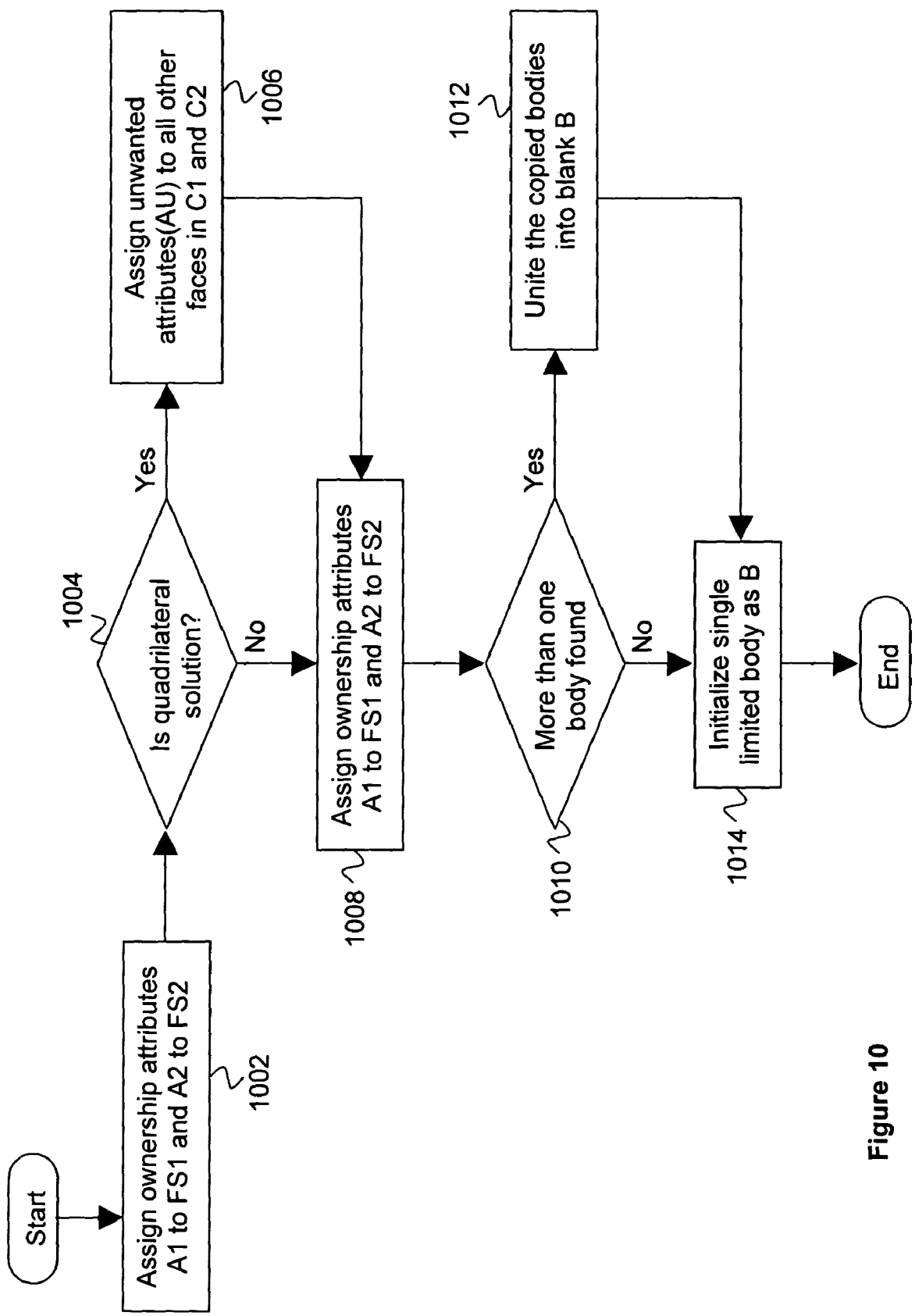
FIG. 10 illustrates one embodiment of the operational flow for generating a blank.

Referring now to FIG. 10, wherein one embodiment of the operation flow for generating a blank is illustrated. As shown, for the embodiment, weld bead modeling function 114 first assigns shape manager ownership attributes (A1 and A2) to the selected faces (FS1 and FS2) of the selected components, block 1002. That is, the selected faces are identified as "owners" of the fillet weld bead being generated. At block 1004, weld bead modeling function 114 determines whether a triangular profile or a quadrilateral profile is employed.

If a triangular profile is employed, weld bead modeling function 114 first proceeds to perform the operations at block 1008, otherwise, weld bead modeling function 114 assigns shape manager's unwanted attributes to all other faces of the selected components (C1 and C2), block 1006, before proceeding to perform the operations at block 1008.

At block 1008, weld bead modeling function 114 extracts and copies the bodies from the selected faces of the selected components using shape manager APIs.

At block 1010, weld bead modeling function 114 determines if, more than one body is found. If only one body was found, weld bead modeling function 114 initializes the single body as the blank, B, block 1014.

If more than one body was found, weld bead modeling function 114 unites the multiple bodies, using a shape manager API, by merging them, block 1012, before proceeding to perform the operations of block 1014. At block 1014, weld bead modeling function 114 initializes the united body as the blank, B, instead.

Figure 11:
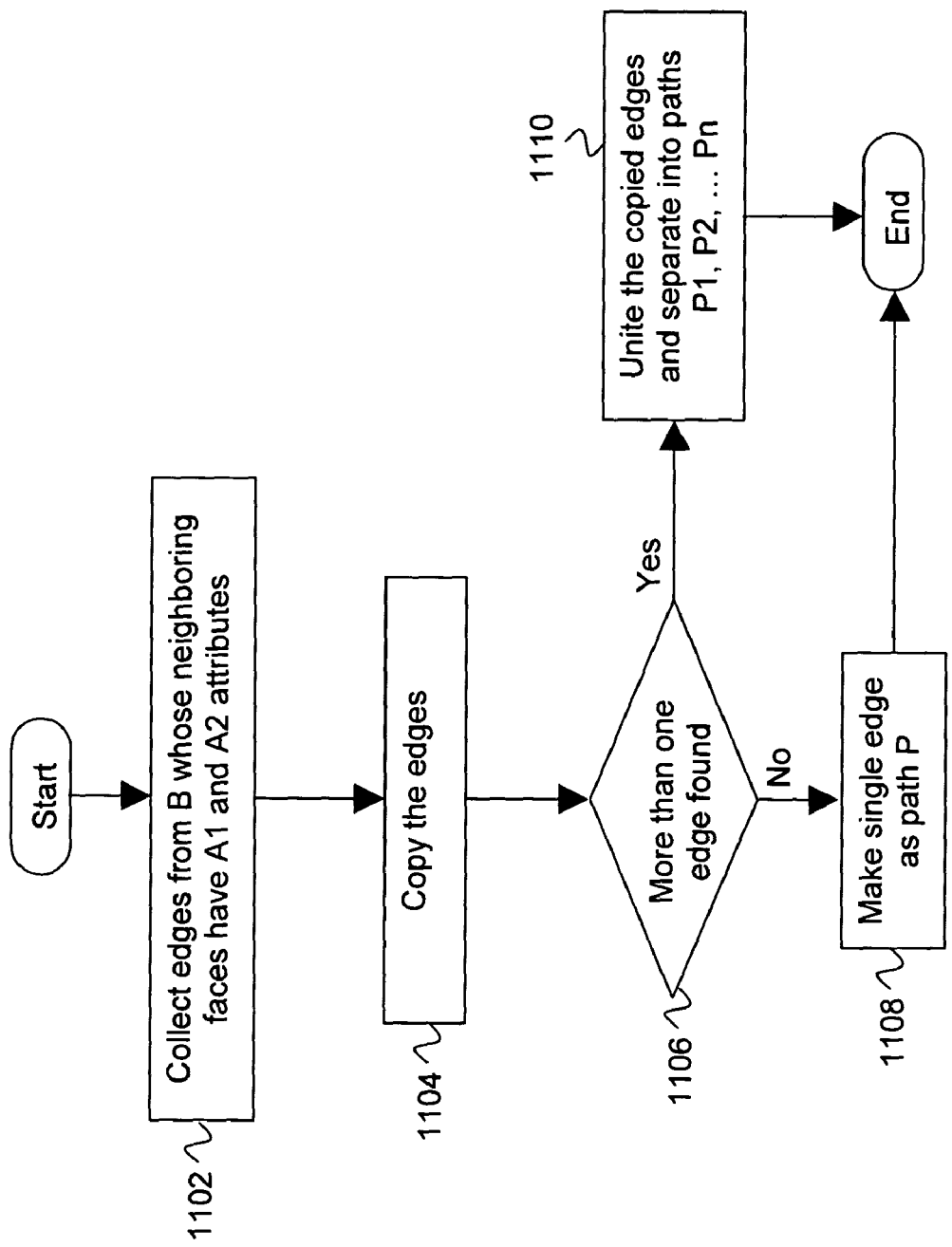
FIG. 11 illustrates one embodiment of the operational flow for generating a path.

Referring now to FIG. 11, wherein one embodiment of the operation flow for generating a path is illustrated. As shown, for the embodiment, weld bead modeling function 114 first collects a number of edges from the blank (B), block 1102. These edges have neighboring faces containing the described ownership attributes (A1 and A2). Then, weld bead modeling function 114 copies the collected edges, using a shape manager API in block 1104.

At block 1106, weld bead modeling function 114 determines if, more than one edge was collected and copied. If only one edge was collected and copied, weld bead modeling function 114 initializes the single edge copy as the path, block 1108. If more than one edge was collected and copied, weld bead modeling function 114 unites the copied edges to form a wire body, using a shape manager API and the resulting disjointed pieces of the wire body are collected as paths P1, P2, . . . Pu, and so forth, block 1110.

Figure 12:
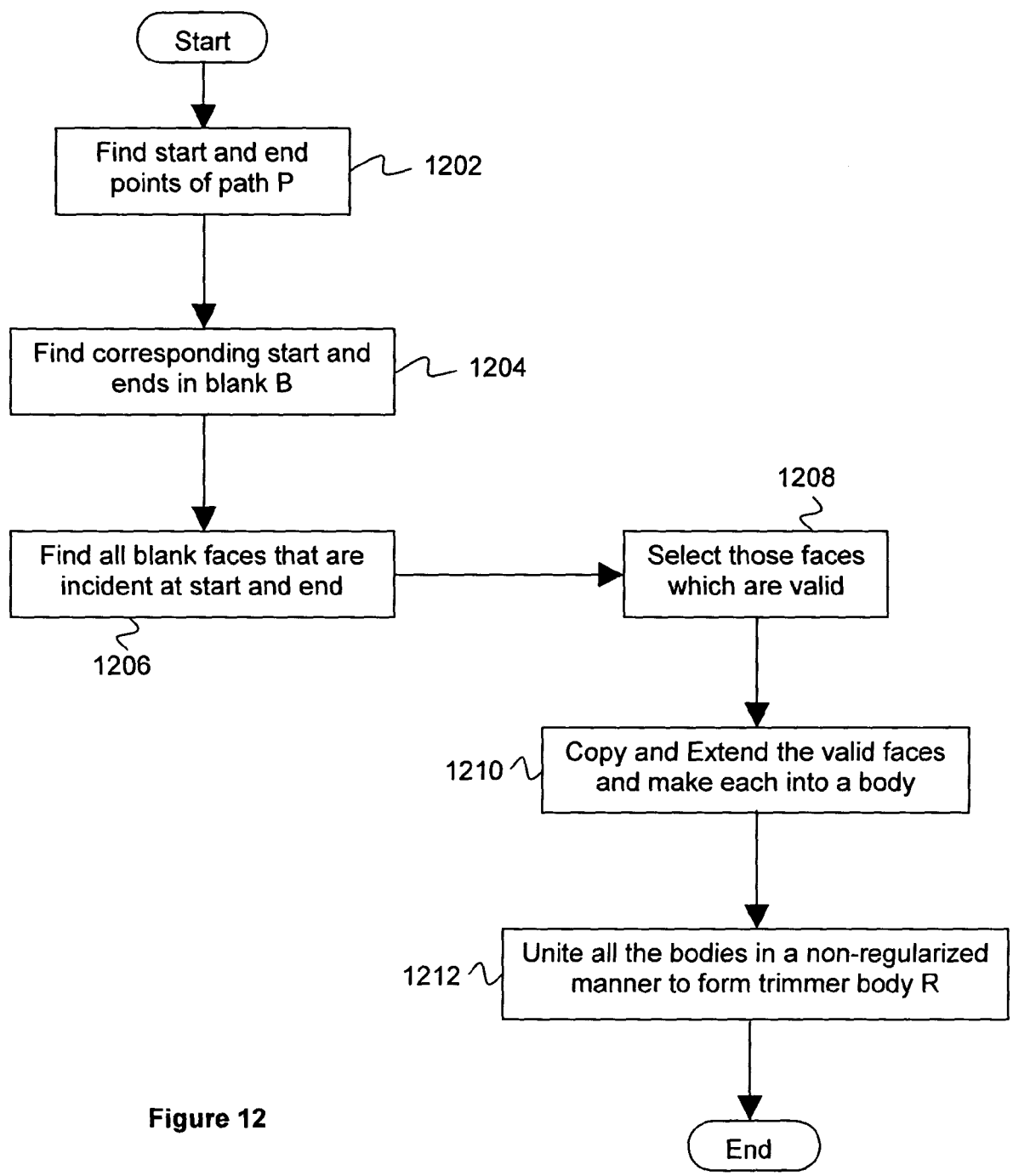
FIG. 12 illustrates one embodiment of the operational flow for generating a trimmer body.

Referring now to FIG. 12, wherein one embodiment of the operation flow for generating a trimmer body is illustrated. The embodiment assumes the trimmer body is generated based on an open path. Further, recall from earlier description, the trimmer body is generated, only if, the path is open.

As shown, for the embodiment, weld bead modeling function 114 first locates the start and end points of an open path (P), block 1202. At block 1204, weld bead modeling function 114 locates points on the blank (B) corresponding to the located start and end points of the path.

Then, at block 1206, weld bead modeling function 114 locates all the faces of the blank that are incident at the corresponding points. Upon locating these faces, weld bead modeling function 114 selects the located faces that are valid, block 1208.

In various embodiments, a located face is invalid if:
the face belongs to FS1 or FS2 (the bead is generated along such faces and they do not contribute to end trimming),
the face geometry is not supported (e.g. in one embodiment, a spline face),
the normal of the planar faces at the start and end points are parallel to the tangents of the path at the respective points, or
the face is a duplicate.

At block 1210, weld bead modeling function 114, uses a shape manager API to copy the valid faces. Such valid faces are extended and made each into a body. Then, weld bead modeling function 114 unites all these bodies in a non-regularized manner and initializes the united body as the trimmer body, more specifically, the data representation of the united body as the data representation of the trimmer body, block 1212.

In various embodiments, weld bead modeling function 114 calls shape manager 116 to unite the bodies.

Thus, it can be seen from the above description, that a fillet weld bead may be efficiently modeled. Based on the facial characteristics it uses a best fit strategy to use the right technique. i.e. triangular or quadrilateral. Besides, it automatically end trims the fillet weld bead when the path is open. Moreover, by virtue of the techniques employed the fillet weld bead neither interferes with the components nor leave gaps between a component and itself.

FIG. 13a-13d illustrate an example application of CAD application 112 having weld bead modeling function 114. The example application assumes the manufacturing of an example article involving the welding of an angle iron 1302a to base plate 1302b (see FIG. 13a).

Accordingly, CAD application 112 may be employed to first facilitate the selection, e.g. by a user, the 9 faces of angle iron 1302a (7 of which, faces 1304a-1304g, are visible, and the remaining two are located at the back of angle iron 1302a (not visible)) and one face 1306 of base plate 1302b, where the fillet welding is to be performed.

In response, weld bead modeling function 114 examines the facial characteristics of the selected faces, and in view of the predominantly geometric characteristics, selects the triangular technique to generate the data representation of the fillet weld.

Figure 13A:
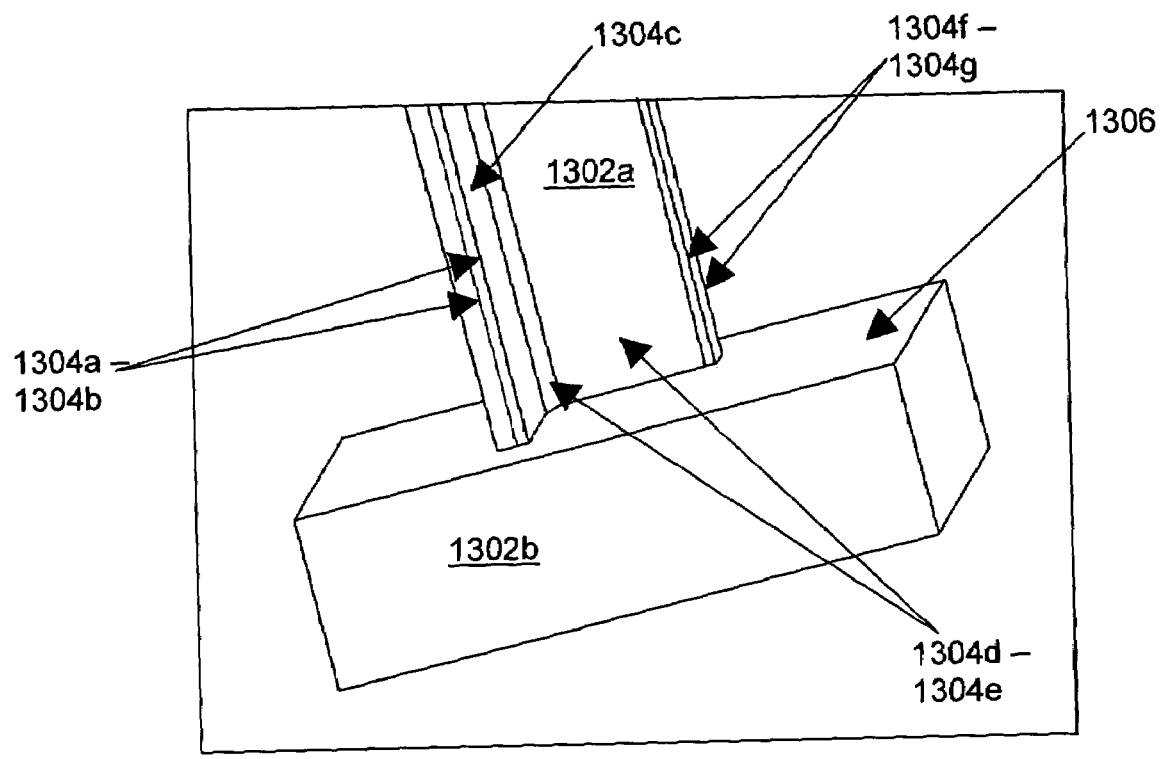
FIGS. 13a-13d illustrate an example application of one embodiment of the present invention.
Figure 13B:
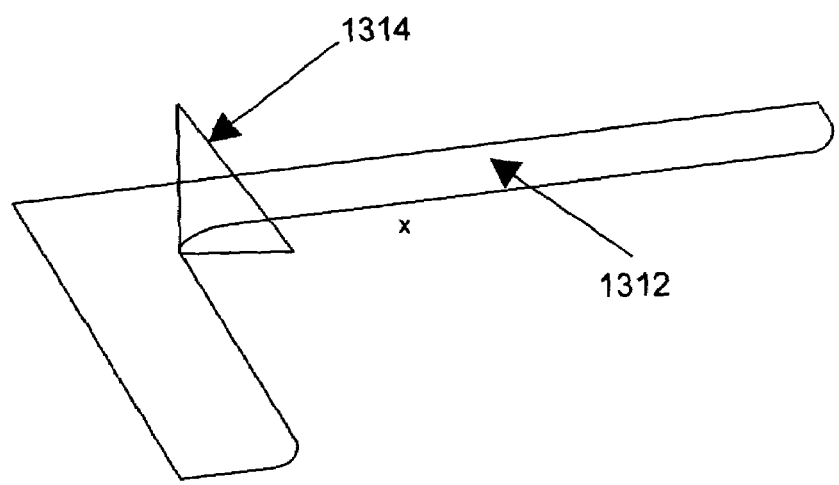

FIG. 13b illustrates the path 1312 and the triangular profile 1314 successively generated in the application of the triangular technique. Note that since the path is closed, as described earlier, no trimmer body was generated.

Figure 13C:
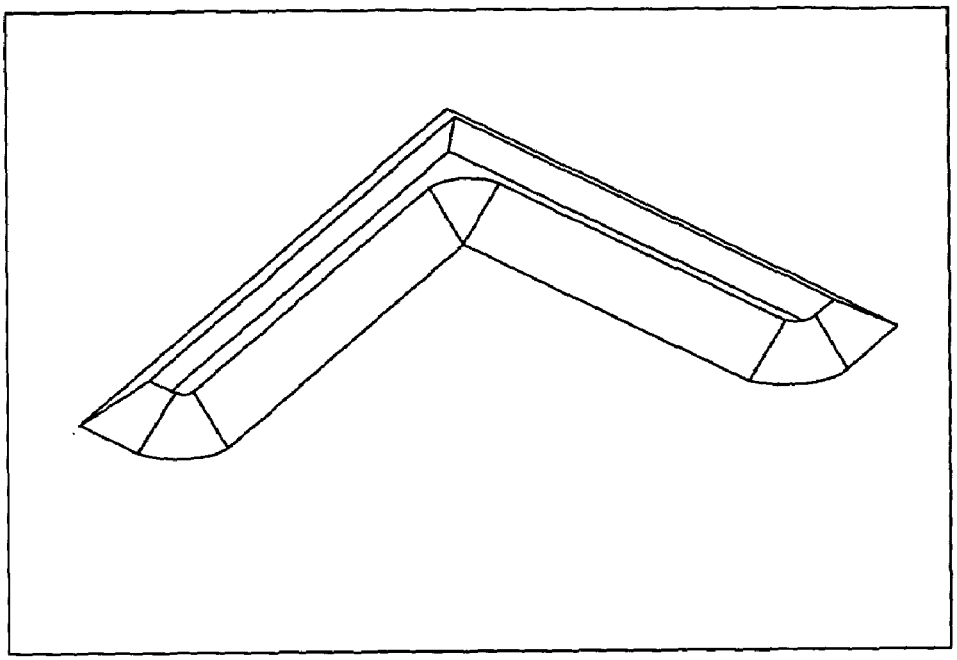
Figure 13D:
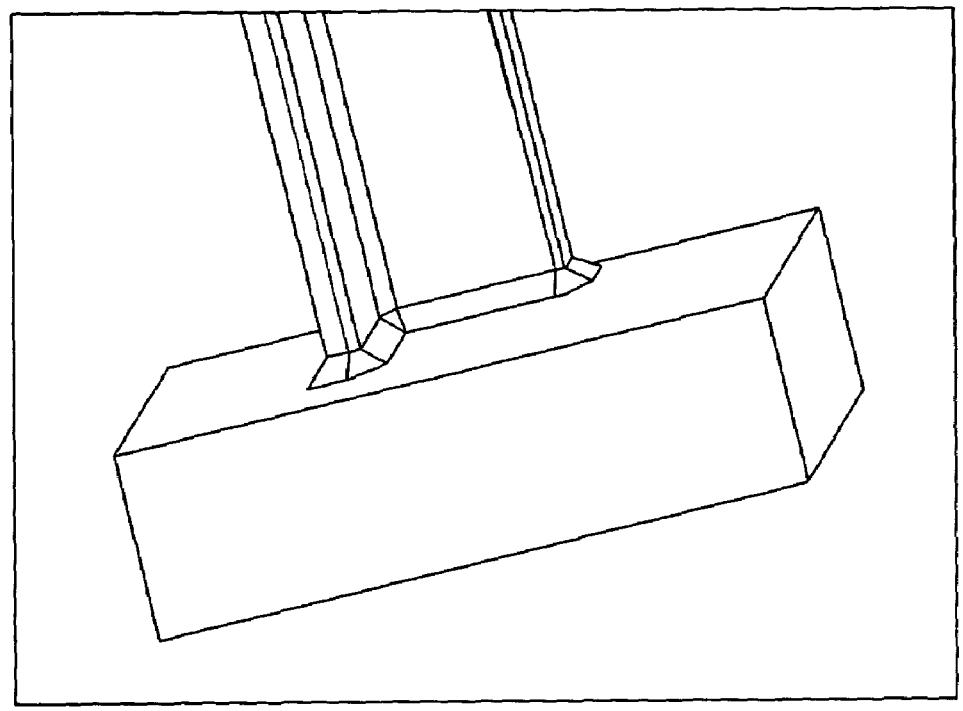

FIG. 13c and FIG. 13d illustrate the resulting fillet weld bead by itself, and its application in joining angle iron 1302a and base plate 1302b, respectively.

FIG. 14a-14e illustrate an example application of CAD application 112 having weld bead modeling function 114. The example application assumes the manufacturing of an example article involving the welding of rib 1402b to L-bracket 1402a (see FIG. 14a).

Accordingly, CAD application 112 may be employed to first facilitate the selection, e.g. by a user, single face 1404 of rib 1402b and 2 faces, 1406a-1406b of L-bracket 1402a, where the fillet welding is to be performed.

In response, weld bead modeling function 114 examines the predominantly geometric characteristics of the selected faces, and in view of these characteristics, selects the triangular technique to generate the data representation of the fillet weld.

Figure 14C:
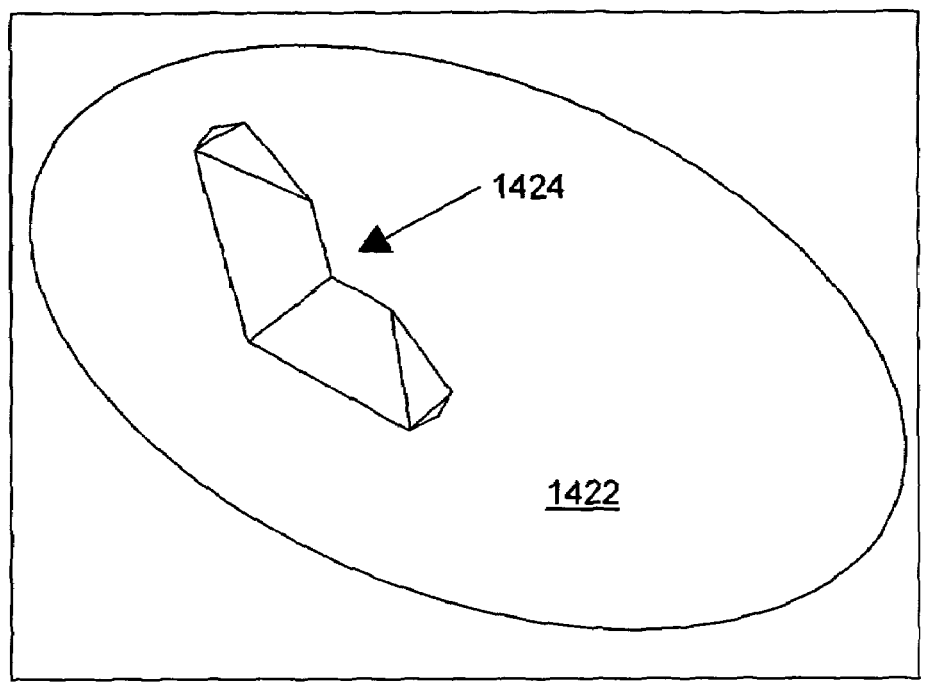

FIG. 14b illustrates the path 1412 and the triangular profile 1414 successively generated in the application of the triangular technique. Since the path is open, accordingly, trimmer body 1422 (see FIG. 14c) is generated. Also illustrated in FIG. 14c tool 1424, is generated as described earlier.

Figure 14D:
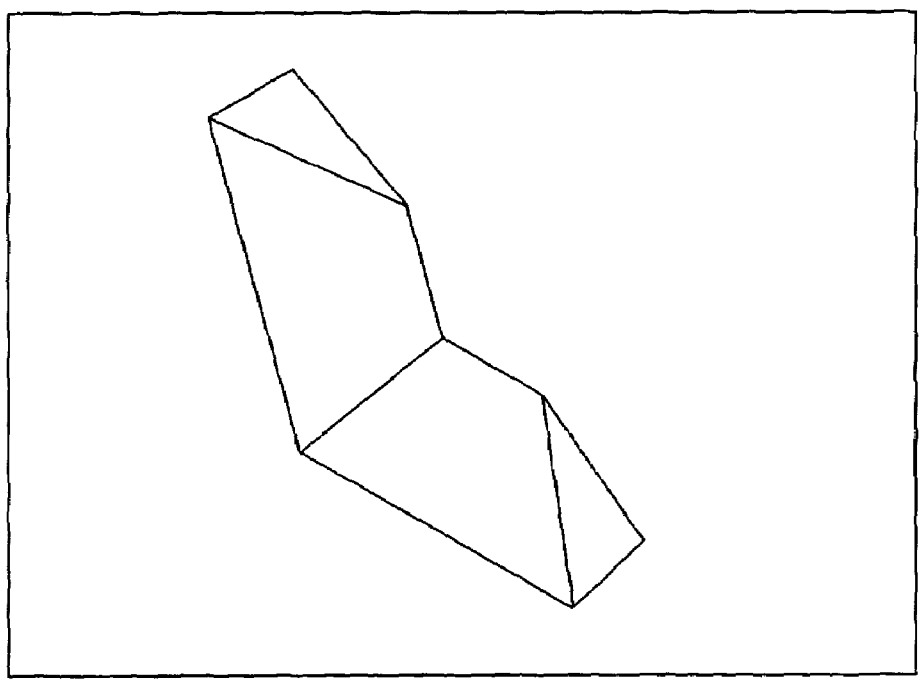
Figure 14E:
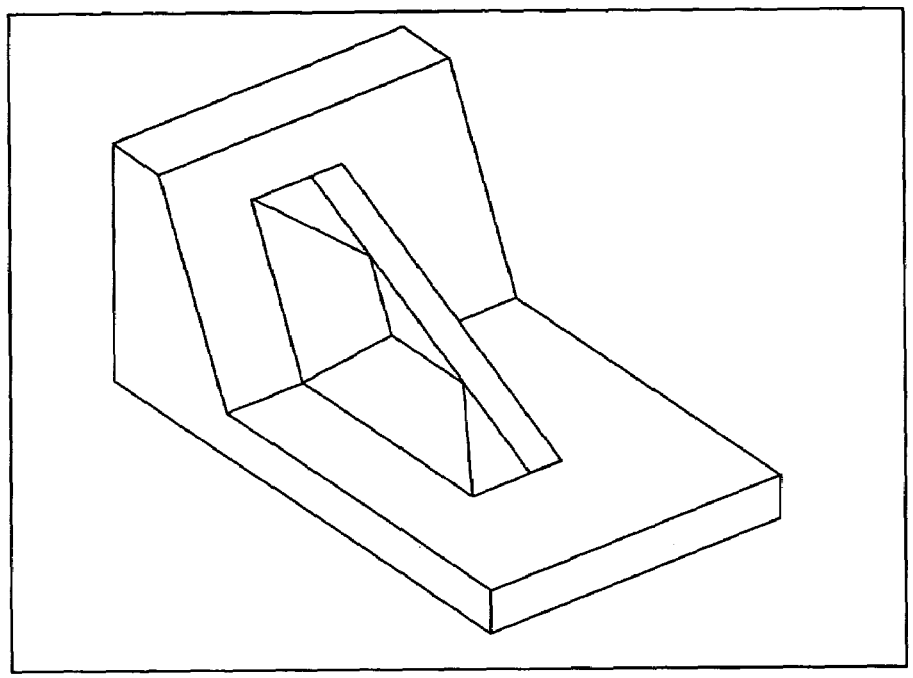

FIG. 14d and FIG. 14e illustrate the resulting fillet weld bead by itself, and its application in joining angle iron 1402a and base plate 1402b, respectively.

FIG. 15a-15e illustrate an example application of CAD application 112 having weld bead modeling function 114. The example application assumes the manufacturing of an example article involving the welding of an angled component 1502a to base plate 1502b (see FIG. 15a).

Accordingly, CAD application 112 may be employed to first facilitate the selection, e.g. by a user, 2 faces 1504a-1504b of angled component 1502a and one face 1506 of base plate 1502b, where the fillet welding is to be performed.

In response, the weld bead modeling function 114 examines the predominantly geometric characteristics of the selected faces, and in view of these characteristics, selects the quadrilateral technique to generate the data representation of the fillet weld.

Figure 15A:
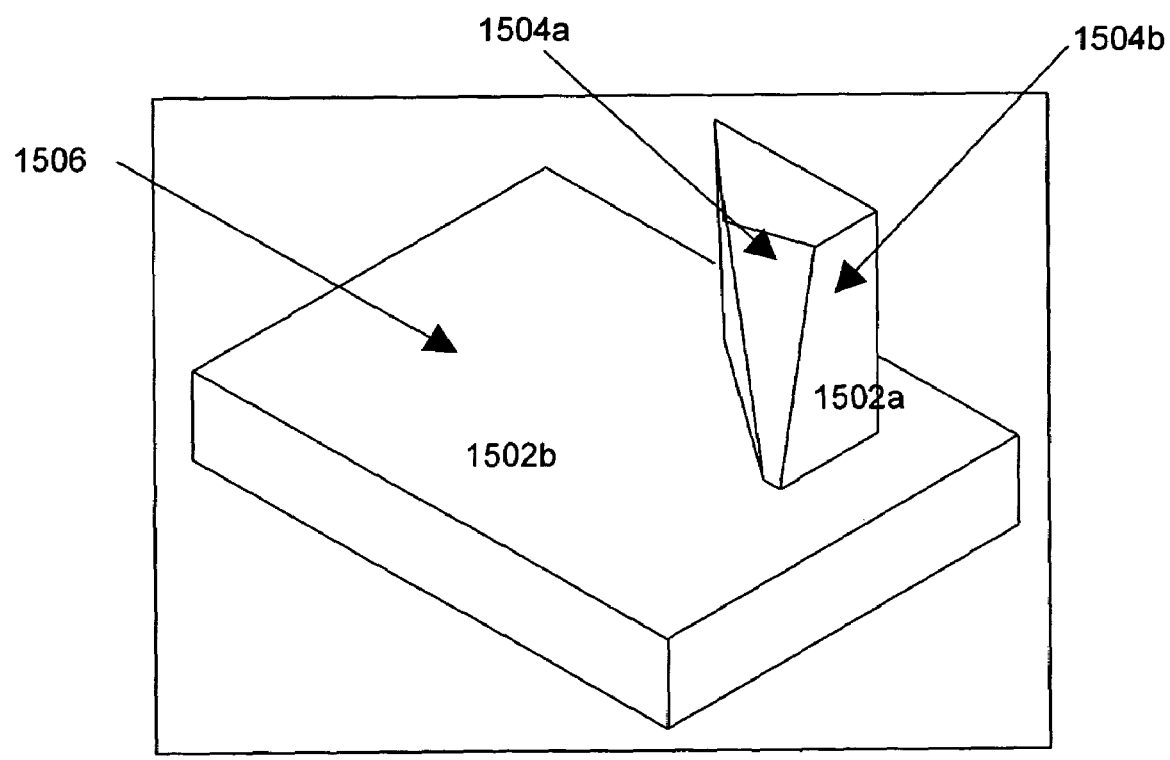
FIGS. 15a-15f illustrate an example application of one embodiment of the present invention.
Figure 15B:
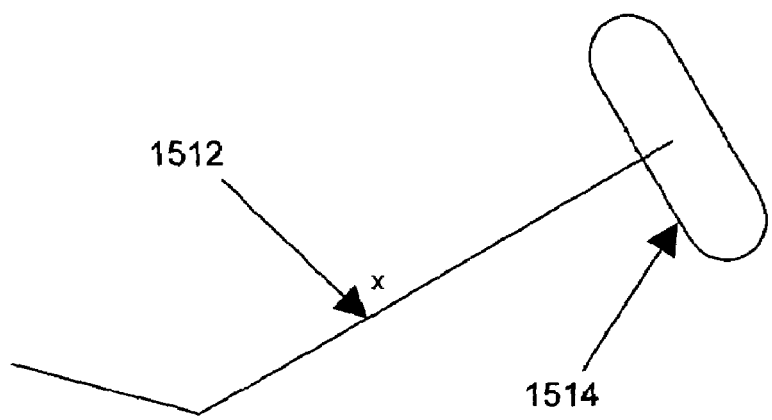
Figure 15C:
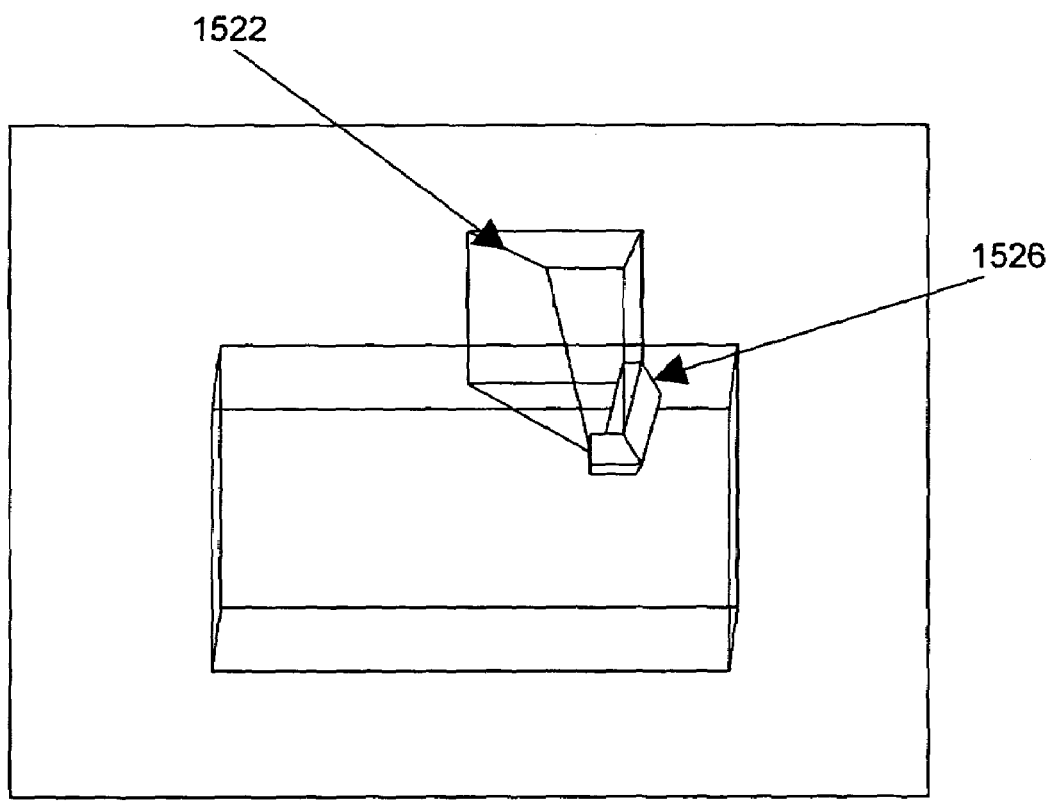
Figure 15D:
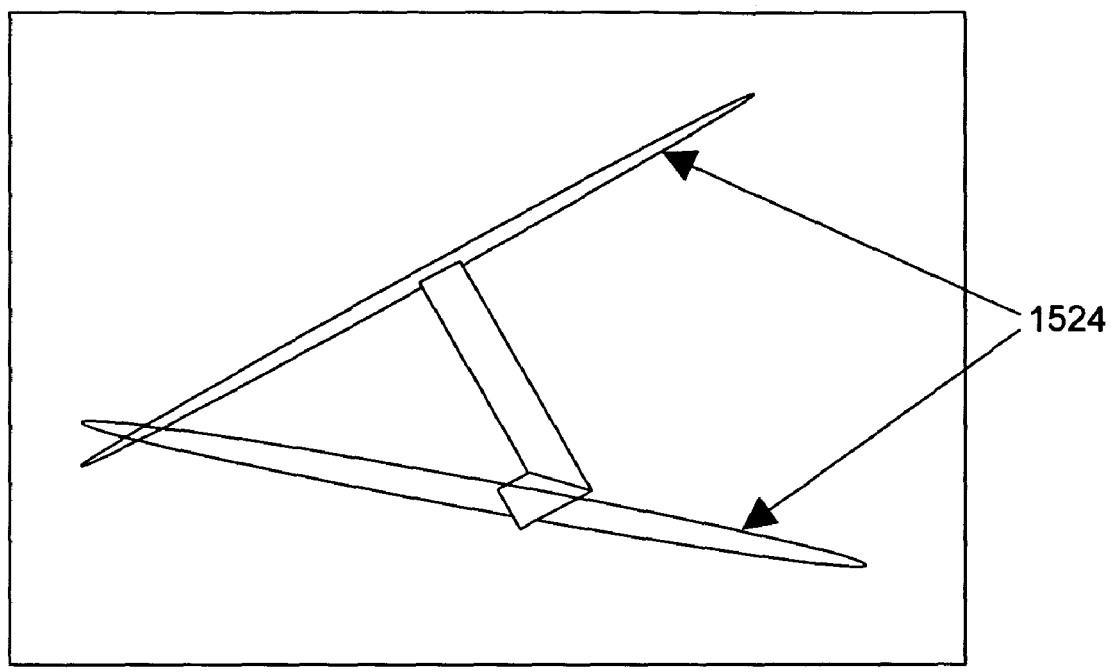

FIG. 15b illustrates the path 1512 and the quadrilateral profile 1514 successively generated in the application of the quadrilateral technique. Body 1522 is illustrated in FIG. 15c. Since the path is open, accordingly, trimmer body 1524, illustrated in FIG. 15d, is generated. Also illustrated in FIG. 15c is tool 1526 generated as described earlier.

Figure 15E:
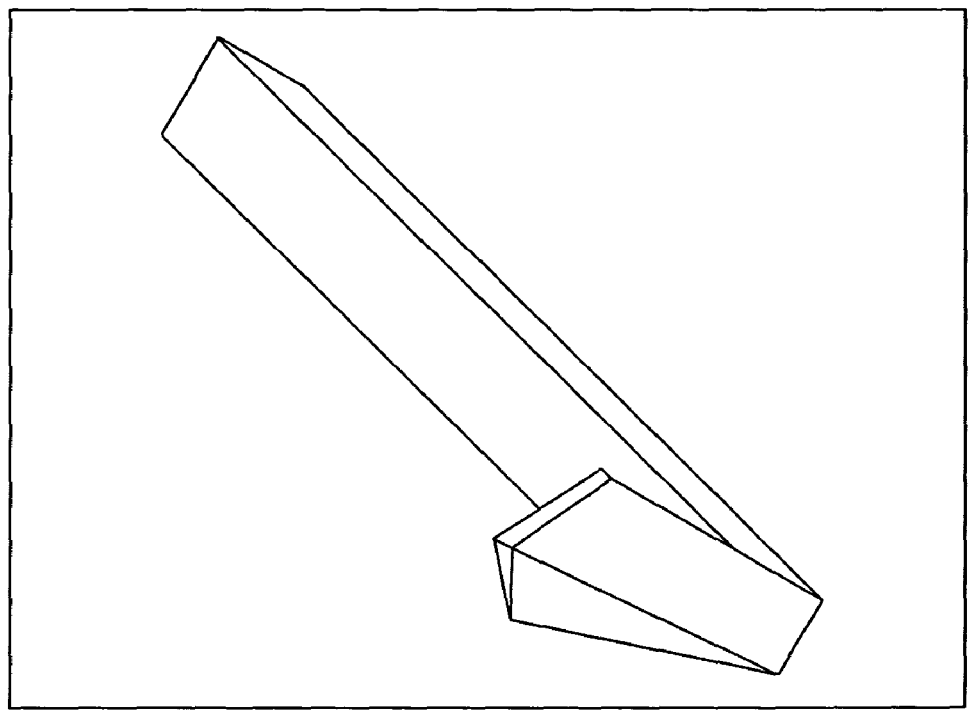
Figure 15F:
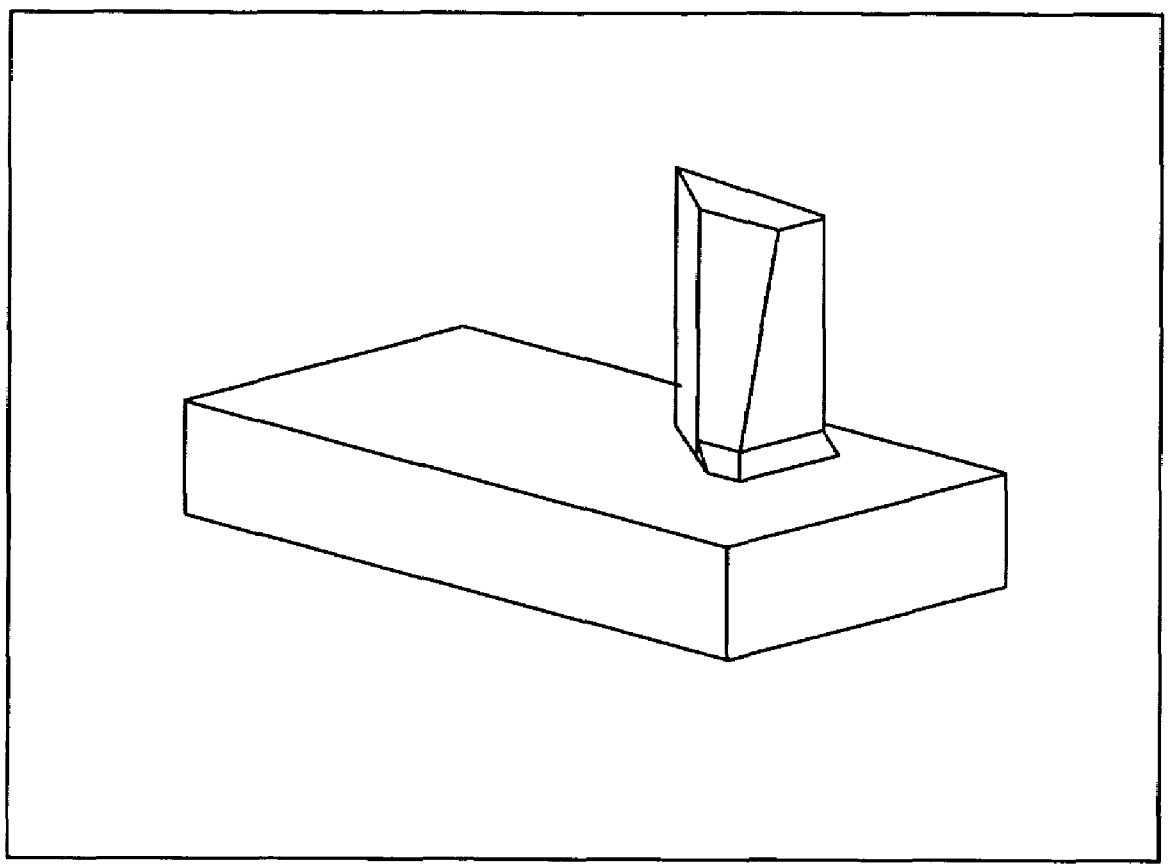

FIG. 15e and FIG. 15f illustrate the resulting fillet weld bead by itself, and its application in joining angled component 1502a and base plate 1502b, respectively.

Thus, it can be seen from the above descriptions, embodiments of a novel method to generate fillet welds have been described. While the novel method has been described in terms of the foregoing embodiments, those skilled in the art will recognize that the method is not limited to the embodiments described. The method may be practiced with modifications and alterations within the spirit and scope of the appended claims.

Accordingly, the description is to be regarded as illustrative instead of restrictive.

What is claimed is:

1. In a computing environment, a method to generate a fillet weld bead to be used to weld a plurality of components of an article of manufacture together at one or more faces of the components in the manufacturing of the article outside the computing environment, the method comprising:
   examining within the computing environment, facial characteristics of the faces of the components;
   selecting within the computing environment, a generation technique based at least in part on a result of said examining;
   applying within the computing environment, the selected generation technique to generate a data representation of the fillet weld bead; and
   storing the data representation of the fillet weld bead in a computer-readable medium.

2. The method of claim 1, wherein said examining comprises examining within the computing environment, one of the faces to determine at least one of whether the face is planar and whether the face is cylindrical.

3. The method of claim 1, wherein said examining comprises examining within the computing environment, the faces of one component to determine whether the faces lie in a single plane.

4. The method of claim 1, wherein said examining comprises examining within the computing environment, a first face of a first component and a corresponding second face of a second component to determine whether the first and second faces are perpendicular.

5. The method of claim 1, wherein the selecting and applying comprise selecting and applying within the computing environment, a generation technique that includes construction of a triangular profile.

6. The method of claim 1, wherein the selecting and applying comprise selecting and applying within the computing environment, a generation technique that includes construction of a quadrilateral profile.

7. The method of claim 1, wherein the applying comprises assigning within the computing environment, one or more attributes to the faces, including at least one of
   tracking attributes specifying one or more attributes that are to be propagated during each of a split, copy and merge operation performed within the computing environment on data representations of the faces, and
   ownership attributes specifying ownership of the fillet weld bead by the faces.

8. The method of claim 1, wherein the applying comprises generating within the computing environment, a blank, based at least in part on bodies referred to by the faces.

9. The method of claim 1, wherein the applying comprises generating within the computing environment, one or more paths, based at least in part on edges of a blank.

10. The method of claim 1, wherein said applying comprises generating with the computing environment, a tool, based at least in part on a profile.

11. The method of claim 1, wherein said applying comprises constructing within the computing environment, a trimmer body, and applying within the computing environment, selective boolean operation between the trimmer body and a tool.

12. In a computing environment, a method of operation comprising:
   constructing within the computing environment, a profile based at least in part on faces of components of an article of a manufacture to be fillet welded together at the faces;
   generating within the computing environment, a tool based at least in part on the constructed profile; and
   conditionally trimming within the computing environment, the tool, with a data representation of the untrimmed tool to be initialized as a data representation of a fillet weld bead to be used to weld the components together at the faces if, trimming is not performed, and a data representation of the trimmed tool to be initialized as a data representation of a fillet weld bead to be used to weld the components together at the faces, if, trimming was performed; and
   storing the data representation of the fillet weld bead in a computer-readable medium.

13. The method of claim 12, wherein the constructing comprises constructing within the computing environment, a triangular profile.

14. The method of claim 12, wherein the constructing comprises constructing within the computing environment, a quadrilateral profile.

15. The method of claim 12, wherein the method further comprises assigning within the computing environment, one or more attributes to the faces, including tracking attributes specifying one or more attributes of the faces that are to be propagated during each of a split, copy and merge operation performed within the computing environment on data representations of the faces.

16. The method of claim 12, wherein the method further comprises assigning within the computing environment, one or more attributes to the faces, including ownership attributes specifying ownership of the fillet weld by the faces.

17. The method of claim 12, wherein the method further comprises assigning within the computing environment, one or more attributes to other faces of the components specifying faces of the fillet weld bead that are not to overlap with these other faces of the components.

18. The method of claim 12, wherein the method further comprises generating within the computing environment, a blank, based at least in part on bodies referred to by the faces.

19. The method of claim 18, wherein the generating of a blank comprises
locating within the computing environment, one or more bodies referred to by the faces;
replicating within the computing environment, data representations of the located one or more bodies;
conditionally forming within the computing environment, a unified body, if, data representations of more than one body are replicated; and
initializing within the computing environment, a data representation of a located body as a data representation of the blank if, only one body was located, and initializing within the computing environment, a data representation of the unified body as a data representation of the blank if, the conditional forming operation was performed.

20. The method of claim 12, wherein the method further comprises generating within the computing environment, one or more paths, based at least in part on edges of a blank.

21. The method of claim 20, wherein the generating of one or more paths comprises
collecting within the computing environment, one or more edges of a blank;
replicating within the computing environment, data representations of the collected one or more edges;
conditionally forming within the computing environment, a wire body if, data representations of more than one edge are replicated; and
initializing within the computing environment, a data representation of a collected edge as a data representation of a path if, only one edge of a blank was collected, and initializing within the computing environment, data representations of disjoint pieces of the wire body as data representations of one or more paths if, the conditional forming operation was performed;
wherein the computing environment is a computer aided design environment.

22. The method of claim 12, wherein the generating comprises sweeping the constructed profile within the computing environment to generate the tool.

23. The method of claim 12, wherein said conditional trimming comprises constructing within the computing environment, a trimmer body, and applying within the computing environment, a selective boolean operation between the trimmer body and the tool.

24. The method of claim 23, wherein the constructing of a trimmer body comprises determining within the computing environment, whether a path is open or closed.

25. The method of claim 24, wherein the method further comprises on determining the path is open,
determining within the computing environment, a start and an end point of the path;
determining within the computing environment, a first and a second point on a blank corresponding to the start and end points of the path;
determining within the computing environment, faces of the blank that are incident on the first and second points;
selecting within the computing environment, valid ones of said faces;
copying and extending within the computing environment, the selected valid ones of said faces into bodies; and
uniting within the computing environment, said bodies, to form the trimmer body.

26. The method of claim 12, wherein the method further comprises initializing within the computing environment, a data representation of the tool as a data representation of the fillet weld bead if trimming is not performed.

27. The method of claim 12, wherein said conditional trimming comprises performing within the computing environment,
a transfer of attributes from edges of the profile to lateral faces of the tool;
a selective boolean operation on the tool and a trimmer body; and
an initialization of a result of the selective boolean operation as a data representation of the fillet weld bead.

28. The method of claim 12, wherein said conditional trimming comprises performing within the computing environment,
a transfer of attributes from edges of the profile to lateral faces of the tool;
a subtraction of a blank, created based at least in part on bodies referred to by the faces, from the tool;
a selective boolean operation on a result of the subtraction and a trimmer body; and
an initialization of a result of the selective boolean operation as a data representation of the fillet weld bead.

29. In a computer aided design environment, a method of operation comprising:
collecting within the computer aided design environment, one or more edges of a blank generated based at least in part on a plurality of faces of a plurality of components of an article of manufacture where the components are to be fillet welded together at the faces when the article is manufactured outside the computer aided design environment;
replicating within the computer aided design environment, data representations of the collected one or more edges;
conditionally forming within the computer aided design environment, a wire body, if, data representations of more than one edge are replicated; and
initializing within the computer aided design environment, a data representation of a collected edge as a data representation of a path if only one edge of a blank was located, and initializing within the computer aided design environment, data representations of disjoint pieces of the wire body as data representations of one or more paths if, the conditional forming operation was performed, where the path is used to generate a data representation of a fillet weld bead of the fillet welding operation, and where the data representation of the fillet weld bead is to be stored in a computer-readable medium.

30. The method of claim 29, wherein the method further comprises determining within the computing environment whether the path is open, and if the path is determined to be open, further
determining within the computing environment, a start and an end point of the path;

determining within the computing environment, a first and a second point on a blank corresponding to the start and end points of the path;

determining within the computing environment, faces of the blank that are incident on the first and second points;

selecting within the computing environment, valid ones of said faces;

copying and extending within the computing environment, the selected valid ones of said faces into bodies; and uniting within the computing environment, said bodies, to form a trimmer body, where the trimmer body is used for the generation of the data representation of the fillet weld bead.

31. An apparatus comprising:

a storage medium having stored therein a plurality of programming instructions designed to enable the apparatus to examine facial characteristics of a plurality of faces of a plurality of components of an article of manufacture where the components are to be fillet welded together at the faces when the article is manufactured outside the apparatus;

select a generation technique based at least in part on a result of said examine, apply the selected generation technique to generate a data representation of a fillet weld bead of the fillet welding operation; and store the data representation of the fillet weld bead in the storage medium; and at least one processor coupled to the storage medium to execute the programming instructions.

32. The apparatus of claim 31, wherein the programming instructions are further designed to enable the apparatus to perform said examine by examining one of the faces to determine at least one of whether the face is planar and whether the face is cylindrical.

33. The apparatus of claim 31, wherein the programming instructions are further designed to enable the apparatus to perform, as part of said examining, examination of the faces of one component to determine whether the faces lie in a single plane.

34. The apparatus of claim 31, wherein the programming instructions are further designed to enable the apparatus to perform, as part of said examining, examination of a first face of a first component and a corresponding second face of a second component to determine whether the two first and second faces are perpendicular.

35. The apparatus of claim 31, wherein the programming instructions are further designed to enable the apparatus to perform the selecting and applying by selecting and applying a generation technique that includes construction of a triangular profile.

36. The apparatus of claim 31, wherein the programming instructions are further designed to enable the apparatus to perform the selecting and applying by selecting and applying a generation technique that includes construction of a quadrilateral profile.

37. An apparatus comprising:

a storage medium having stored therein a plurality of programming instructions designed to enable the apparatus to construct a profile based at least in part on faces of components of an article of a manufacture to be fillet welded together at the faces, generate a tool based at least in part on the constructed profile, conditionally trim the tool, with a data representation of the untrimmed tool to be initialized as a data representation of a fillet weld bead to be used to weld the components together at the faces, if trimming is not performed, and a data representation of the trimmed tool to be initialized as a data representation of a fillet weld bead to be used to weld the component together at the faces, if trimming was performed; and store the data representation of the fillet weld bead in the storage medium; and at least one processor coupled to the storage medium to execute the programming instructions.

38. The apparatus of claim 37, wherein the programming instructions are further designed to perform the constructing by constructing a triangular profile.

39. The apparatus of claim 37, wherein the programming instructions are further designed to perform the constructing by constructing a quadrilateral profile.

40. The apparatus of claim 37, wherein the programming instructions are further designed to enable the apparatus to locate one or more bodies referred to by the faces, replicate data representations of the located one or more bodies, conditionally form a unified body, if, data representations of more than one body are replicated, and initialize a data representation of a located body as a data representation of a blank if, only one body was located, and initialize a data representation of the unified body as a data representation of the blank if, the conditional forming operation was performed, where the data representation of the initialized blank is to be used in generating a data representation of a fillet weld bead of the fillet welding operation.

41. An apparatus comprising:

a storage medium having stored therein a plurality of programming instructions designed to enable the apparatus to, in a computer aided design environment:

collect one or more edges of a blank generated based at least in part on a plurality of faces of a plurality of components of an article of manufacture where the components are to be fillet welded together at the faces when the article is manufactured outside the computing environment;

replicate data representations of the located one or more edges;

conditionally form a wire body, if, data representations of more than one edge are replicated, and initialize a data representation of a located edge as a data representation of a path if, only one edge of a blank was located, and initialize data representations of disjoint pieces of the wire body as data representations of one or more paths if, the conditional forming operation was performed, where the path is used to generating a data representation of a fillet weld bead of the fillet welding operation, and where the data representation of the fillet weld bead is to be stored in the storage medium; and at least one processor coupled to the storage medium to execute the programming instructions.

42. The apparatus of claim 41, wherein the programming instructions are further designed to enable the apparatus to determine whether the path is open, and if the path is determined to be open, further determine a start and an end point of the path, determine a first and a second point on a blank corresponding to the start and end points of the path, determine faces of the blank that are incident on the first and second points, select valid ones of said faces, copy and extend the selected valid ones of said faces into bodies, and unite said bodies, to form a trimmer body, where the trimmer body is used for the generation of the data representation of the fillet weld bead.

* * * * *